United States Patent [19]

Peterson

[11] Patent Number: 4,952,376
[45] Date of Patent: Aug. 28, 1990

[54] OXIDATION CHAMBER
[75] Inventor: Ronald L. Peterson, Tucson, Ariz.
[73] Assignee: Peroxidation Systems, Inc., Tucson, Ariz.
[21] Appl. No.: 405,206
[22] Filed: Sep. 11, 1989

Related U.S. Application Data

[62] Division of Ser. No. 243,908, Sep. 13, 1988, Pat. No. 4,897,246.

[51] Int. Cl.⁵ ............................................. B01J 19/08
[52] U.S. Cl. ................................. 422/186.3; 422/24; 422/186.07; 422/205
[58] Field of Search ............... 422/186.3, 24, 186.07, 422/205

[56] References Cited

U.S. PATENT DOCUMENTS 4,050,897 9/1977 Klein .................................. 422/205
4,775,634 10/1988 Sienkiewicz ........................ 422/80
4,897,246 1/1990 Peterson ......................... 422/186.3

Primary Examiner—Stephen J. Lechert, Jr.
Assistant Examiner—Nina Bhat
Attorney, Agent, or Firm—Daniel C. McKown

[57] ABSTRACT

An oxidation chamber for use in the treatment of organically contaminated water and waste liquids includes a lamp seal assembly that accommodates the thermal expansion of an ultraviolet lamp while at the same time protecting the lamp from direct contact with the liquid being treated. The lamp seal assembly facilitates replacement of burned out lamps and cleaning of the protective tube that surrounds the lamp. In another aspect of the invention, a specially designed family of baffles and distributors are provided so that the chamber can accommodate a wide range of flow rates simply by replacing one set of distributors by a different set of distributors.

5 Claims, 4 Drawing Sheets

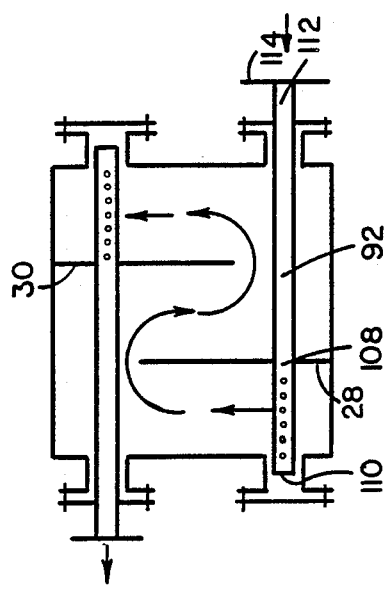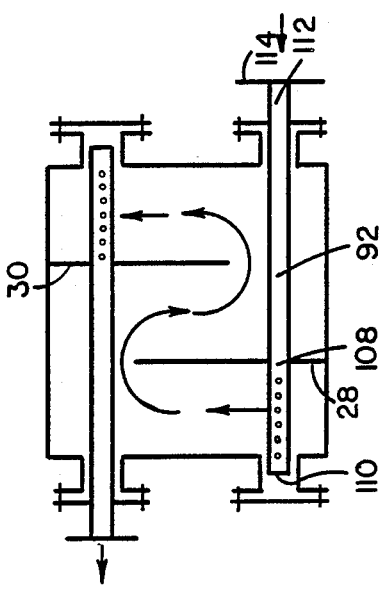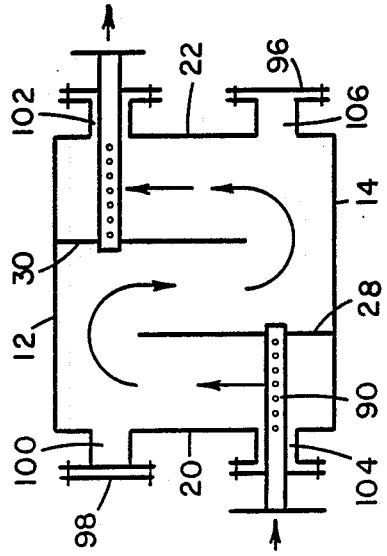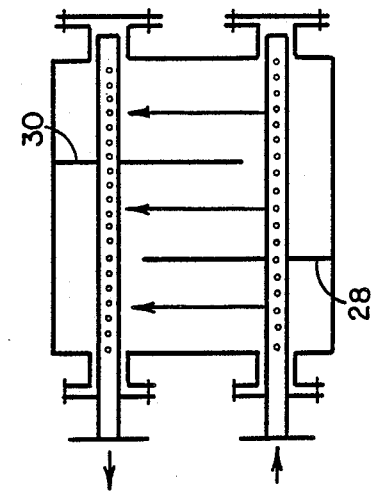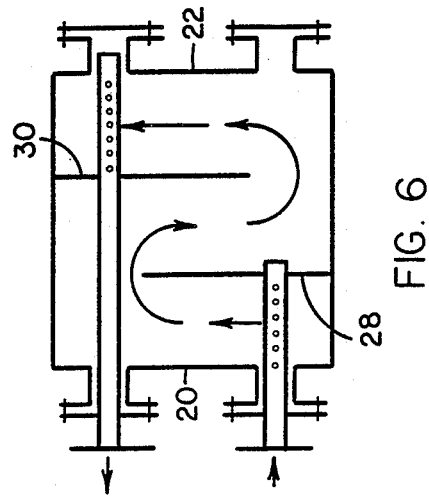

OXIDATION CHAMBER

This is a continuation of co-pending application Ser. No. 07/243,908 filed on Sept. 13, 1988.

BACKGROUND OF THE INVENTION

1. Field of the Invention

The present invention is in the field of water or wastewater treatment and specifically relates to apparatus for use in destroying dissolved organic contaminants in the water or wastewater.

Hydrogen peroxide is added to the water or wastewater, which is then subjected to intense ultraviolet radiation. The ultraviolet radiation breaks the hydrogen peroxide into hydroxyl radicals which are powerful oxidants. These radicals attack and oxidize the organic contaminants which are also being broken down by the ultraviolet radiation. Applications of the apparatus include the detoxification of industrial wastewater or the complete destruction of organic contaminants in the water, the destruction of solvent, pesticides and fuels, or other organic contaminants found in groundwater, the destruction of concentrated organically contaminated aqueous wastes, and the production of high quality organic-free water for industrial processes.

2. The Prior Art

The present invention is a part of a system for treating liquids, usually water, containing undesirable organic compounds to render those compounds harmless through the action of strong ultraviolet radiation and through chemical oxidation.

The overall system includes an electrical power supply, controls, an oxidation chamber, piping and wiring, and a steel skid on which the other components are mounted. The present invention relates to the oxidation chamber. The liquid to be treated is caused to flow through the oxidation chamber.

Full-scale systems have been installed at several locations throughout the country and are operating routinely. That this system operates with high reliability and safety is attributable in large part to the engineering innovations to be disclosed below, and is particularly surprising in view of the potential hazards involved.

One model of the system is 15 feet long, 7 feet wide, and 8 feet high; it weighs 12,000 pounds. This unit can process 500 gallons per minute of liquid, and uses 425 KVA of 3-phase 480 volt electrical power. A large part of this electrical power flows through quartz ultraviolet lamps that are mounted within the oxidation chamber and that are surrounded by the liquids that are being treated. Clearly the system includes a number of potentially antagonistic elements—high voltages and currents in close proximity to liquids and powerful reagents—. In a very real sense, the inventions disclosed below have made it possible for these antagonistic elements to cooperate in achieving safe and reliable operation on a scale never before attempted.

One can appreciate that the dissipation of hundreds of kilowatts in a cold pressurized liquid poses major challenges in materials selection, in accommodating thermal expansion, and in maintaining good sealing of the chamber.

The unprecedented size and power of the apparatus gave rise to a number of problems for which the prior art provided no solutions, as will be described below.

For example, in U.S. Pat. No. 3,485,576 issued Dec. 23, 1969 to McRae, et al., there is described an ultraviolet disinfection system in which a quartz lamp is in direct contact with the liquid to be disinfected, and a simple O-ring seal is provided at each end of the lamp. In contrast, the amount of power dissipated in the lamps of the present invention makes it essential that the lamps be kept from direct contact with the liquid.

In U.S. Pat. No. 4,273,660 issued June 16, 1981 to Beitzel, there is described a water purification system in which the cylindrical treatment chamber has an annular cross-section. A tubular ultraviolet lamp extends axially through the center hole. The chamber appears to be of unitary construction, and therefore localized thermal expansion will be a problem if a large amount of heat is dissipated by the ultraviolet lamp. Also, fouling of the chamber wall adjacent the ultraviolet lamp will necessitate replacing the entire chamber.

In U.S. Pat. No. 4,694,179 issued Sept. 15, 1987 to Lew, et al., there is described a device for purifying fluid media. The treatment chamber is cylindrical in shape and the ultraviolet lamp is protected from the fluid being treated by a tube that surrounds the ultraviolet lamp. End members at opposite ends of the tubular housing are said to include seals, but the sealing arrangement is neither shown nor specifically described. If the drawings are indicative, the device does not appear to be able to withstand an appreciable amount of thermal expansion of the tube surrounding the lamp, rendering this approach unsuitable for use at high power levels such as those used in the apparatus of the present invention.

Thus, the known prior art does not appear to provide satisfactory approaches for use in the present large-scale high power apparatus wherein multiple lamps are operated in a rectangular chamber.

SUMMARY OF THE INVENTION

Prior to the present invention, conventional thinking was that low pressure ultraviolet lamps should be used for an oxidation chamber because they are more efficient in the sense of producing more ultraviolet radiation for each kilowatt of input power. Typically, the low pressure ultraviolet lamps have smaller dimensions than the medium pressure lamps used in the present invention and considerably lower power ratings per lamp than the medium pressure ultraviolet lamps. The conventional approach would therefore be to use a larger number of low pressure lamps arranged around a transparent tube through which the wastewater flows.

In a conventional design of that type, a reflector is usually positioned behind the lamps in an effort to redirect the part of the radiation that would not normally enter the chamber. Reflectors for ultraviolet light are not efficient, and in any case, some of the reflected light will fall upon other lamps before reaching the water in the transparent tube. Also, when large numbers of closely spaced lamps are used, an appreciable part of the radiation produced falls on adjacent lamps where it is lost by absorption. All of these factors combine to impair the efficiency of the conventional design.

Departing from this conventional design approach, the present inventor chose to use a smaller number of medium pressure lamps, each of considerably higher power than the low pressure lamps. Because in the present invention the lamps are completely surrounded by the water to be treated, no radiation leaving the lamp is wasted and no reflectors are needed.

A number of advantages, not expected at the time of the original design, have since been noted. The high ultraviolet radiation intensity obtained from the medium pressure lamps produces hydroxyl radicals from the hydrogen peroxide at a greater rate, and this causes the oxidation reaction to proceed at a high rate, reducing the size of the oxidation chamber required.

The presence of the medium pressure ultraviolet lamps within the wastewater in the oxidation chamber results in considerable heating of the wastewater, and this also speeds up the reaction. Thus, the heat output of the medium pressure lamps is not wasted.

Other advantages result from the use of the larger medium pressure ultraviolet lamps. The number of medium pressure lamps required is only a fraction of the number of low pressure lamps that would be required to obtain equal radiation intensity. With fewer lamps, cleaning of the quartz tubes surrounding the lamps can be performed more often, and the cleaner tubes deliver more ultraviolet radiation.

The efficiency of low pressure lamps is high over a relatively narrow operating temperature range. This temperature range is relatively close to the temperature of the water being treated. Consequently, changes in the water temperature during treatment will appreciably change the operating temperature of such a lamp. The end result is that at the entrance to the oxidation chamber low pressure lamps would operate below their optimum temperature while at the exit of the oxidation chamber they would operate above their optimum temperature. This reduces the overall efficiency of the low pressure lamp system.

In contrast, medium pressure lamps are less sensitive to changes in operating temperature and in any case, they operate at such a high temperature that changes in water temperature within the normal operating range have little effect on the lamp temperature. The end result is that the medium pressure lamps operate at near their highest efficiency throughout the oxidation chamber.

Because the medium pressure ultraviolet lamps are large enough to span the entire width of the oxidation chamber, end effects are proportionally smaller, resulting in greater efficiency.

An additional advantage of using the larger medium pressure ultraviolet lamps is that their drives are more efficient in converting incoming power to lamp power than are the drives of smaller lamps.

In summary, the use of medium pressure lamps has resulted in the use of fewer lamps, leading to lower capital costs, lower maintenance costs, and lower operating costs.

Although the use of medium pressure ultraviolet lamps in the oxidation chamber has proven to be a significant advance in the art, it was not without some problems, which the present invention has solved. Probably the most apparent problem is the rather intense heating that occurs in the ultraviolet lamp. To avoid placing too great a temperature gradient across the envelope of the lamp, it is necessary to isolate the lamp envelope from the liquid being treated. In accordance with the present invention, this is accomplished by enclosing the ultraviolet lamp within a quartz tube that extends the entire width of the oxidation chamber and projects at each end beyond the wall of the chamber.

Quartz was chosen as the preferred material for the tube, because it provides the most favorable combination of heat resistance, chemical resistance, ability to transmit ultraviolet radiation, ability to withstand prolonged exposure to ultraviolet radiation, and mechanical strength.

Another problem that was aggravated by the use of the longer medium pressure ultraviolet lamps is the correspondingly larger amount of thermal expansion of the lamp. Not only must the thermal expansion of the lamp be accommodated, but also the thermal expansion of the quartz tube that surrounds the lamp. In accordance with the present invention, a cylindrical aluminum plug is located at each end of the lamp and within the quartz tube. The ends of the lamp extend into a central hole in the plug in a loose sliding fit. The plug also fits within the quartz tube in a sliding fit. In this way, the plug supports the ends of the lamp, and by sliding, the plugs accommodate the differential thermal expansion between the lamp and the surrounding quartz tube. Each end of the quartz tube extends through an O-ring that encircles the quartz tube circumferentially so as not to restrict its thermal expansion, while at the same time the O-ring serves as a seal.

This arrangement makes it possible to remove the quartz tube from the oxidation chamber for such purposes as cleaning the quartz tube when it has become fouled. It also allows for replacing the quartz lamp without removal of the quartz tube or draining the chamber.

Because of the relatively high currents and voltages applied to the medium pressure ultraviolet lamps, radio frequency interference radiated from the projecting portion of the lamp was found to reach undesirable levels. This problem was solved by the addition of a tubular member composed of phenolic that surrounds the projecting end of the lamp and that is held in place by a phenolic cover plate. Comparatively little interference radiates from the lead conductors, since they can employ a shielded construction.

It is inevitable that variations in ultraviolet intensity will exist between various points within the oxidation chamber. Accordingly, it is highly desirable that the flow of the liquid to be treated should be fully mixed, rather than laminar. In accordance with the present invention, this is accomplished by providing turbulence-introducing indentations on the oxidation chamber wall. This arrangement serves to redirect any flow tending to move along the wall past a lamp, eliminates an area farthest from the lamp that would tend to receive marginal ultraviolet radiation, and also serves to strengthen the chamber wall. To prevent objectionable material from collecting on the indendations, the sides of these indentations are sloped, and the indentations extend without interruption along the chamber wall.

It was recognized that the flow rate, in gallons per minute, might change drastically from one installation to the next, and from time-to-time in response to changes in the regulatory requirements. Also, it was recognized that one installation may require flow to enter the near side and exit the far side of the oxidation chamber, g while the next installation may be the opposite, or may require that flow enter and leave the same side of the oxidation chamber. In particular, rental units may require one arrangement for a first installation and yet another arrangement with a different flow requirement, at the next installation. The present inventor addressed this need for flexibility in his design of the oxidation chamber.

In accordance with the present invention, each end of the oxidation chamber includes an upper port and a lower port. When not in use, these ports are sealed by steel plates. Liquid is supplied to the oxidation chamber and g removed from it through specialized pipes, called distributors herein and sometimes referred to in the art as headers, that are inserted into the oxidation chamber through the ports.

Two types of distributors are used, as will be seen below in connection with FIGS. 3-7. The first type has holes along its entire length for adding or removing liquid all across the oxidation chamber. The second type has holes confined to a particular interval along its length for adding or removing liquid to a localized region of the oxidation chamber.

As will be seen below, when distributors of the first type are used, the liquid flows through the various segments of the oxidation chamber in parallel, and when distributors of the second type are used, the liquid flows on a serpentine path through the various segments of the oxidation chamber in series. By providing these alternative types of distributors, the flow rate can be greatly altered to suit the need of a particular installation while maintaining maximum turbulence and optimum flow distribution. The same oxidation chamber is used for all installations, and only the relatively inexpensive distributors are changed to alter the flow rate.

Additional design flexibility is provided by the lamp mounting arrangement which permits the number of lamps actually employed for a particular installation to be selected in accordance with the needs of that installation.

Monitoring and control of oxidation chamber performance is achieved by the use of sight ports and sensors that are inserted through the wall of the oxidation chamber. These sight ports permit a human operator to safely view what is taking place within the oxidation chamber. In addition, the site port can be altered to accommodate an ultraviolet sensor for use in measuring the lamp output.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 3 is a diagram showing a flow arrangement that can be produced in the oxidation chamber of FIG. 1;

FIG. 4 is a diagram showing another flow arrangement that can be produced in the oxidation chamber of FIG. 1;

FIG. 5 is a diagram showing another flow arrangement that can be produced in the oxidation chamber of FIG. 1;

FIG. 6 is a diagram showing another flow arrangement that can be produced in the oxidation chamber of FIG. 1;

FIG. 7 is a diagram showing yet another flow arrangement that can be produced in the oxidation chamber of FIG.;

DETAILED DESCRIPTION OF THE PREFERRED EMBODIMENT

Figure 1:
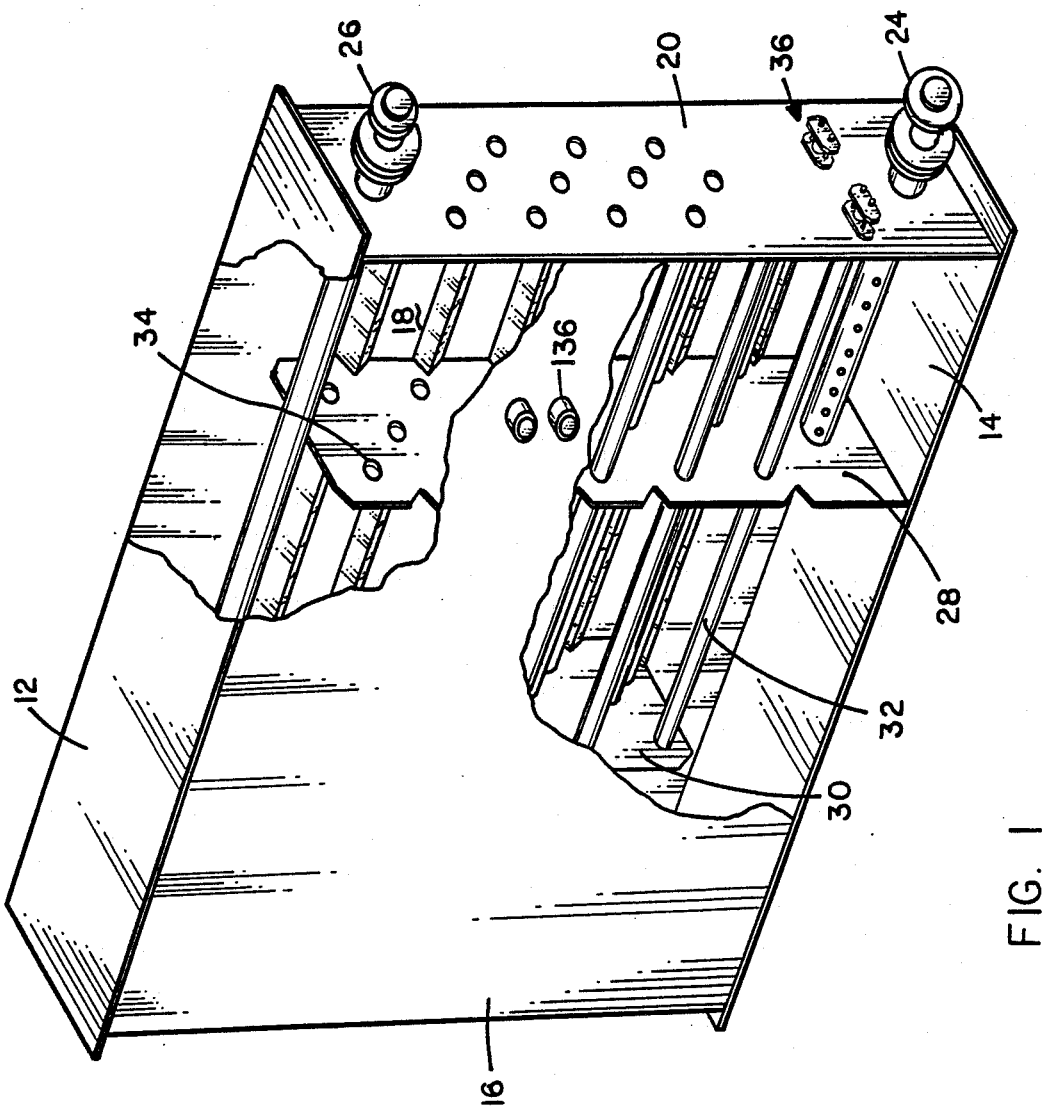
FIG. 1 is a perspective view of the oxidation chamber in a preferred embodiment of the invention, partially cut away so that the parts inside the chamber can be seen.

Turning now to the drawings all of which relate to the same preferred embodiment, and in which like parts are denoted by the same reference numeral throughout, the compactness of the structure of the oxidation chamber can readily be appreciated from FIG. 1.

As seen in FIG. 1, the oxidation chamber is a box-like structure that includes a top wall 12, a bottom wall 14, a front wall 16, a rear wall 18, a first end wall 20, and a second end wall 22 (visible in FIG. 6).

The liquid to be treated is supplied by the inlet distributor 24, and the treated liquid is conducted from the oxidation chamber through the outlet distributor 26.

The interior of the oxidation chamber is partitioned by a first baffle 28 and a second baffle 30. These baffles, in association with various distributors, determine the flow path of the liquid through the oxidation chamber, as will be discussed below in connection with FIGS. 3-7.

Also visible in FIG. 1 are the tubes, of which the tube 32 is typical, which contain the ultraviolet lamps used for irradiating the liquid being treated. These tubes pass through holes, of which the hole 34 is typical, in the baffles.

Figure 2:
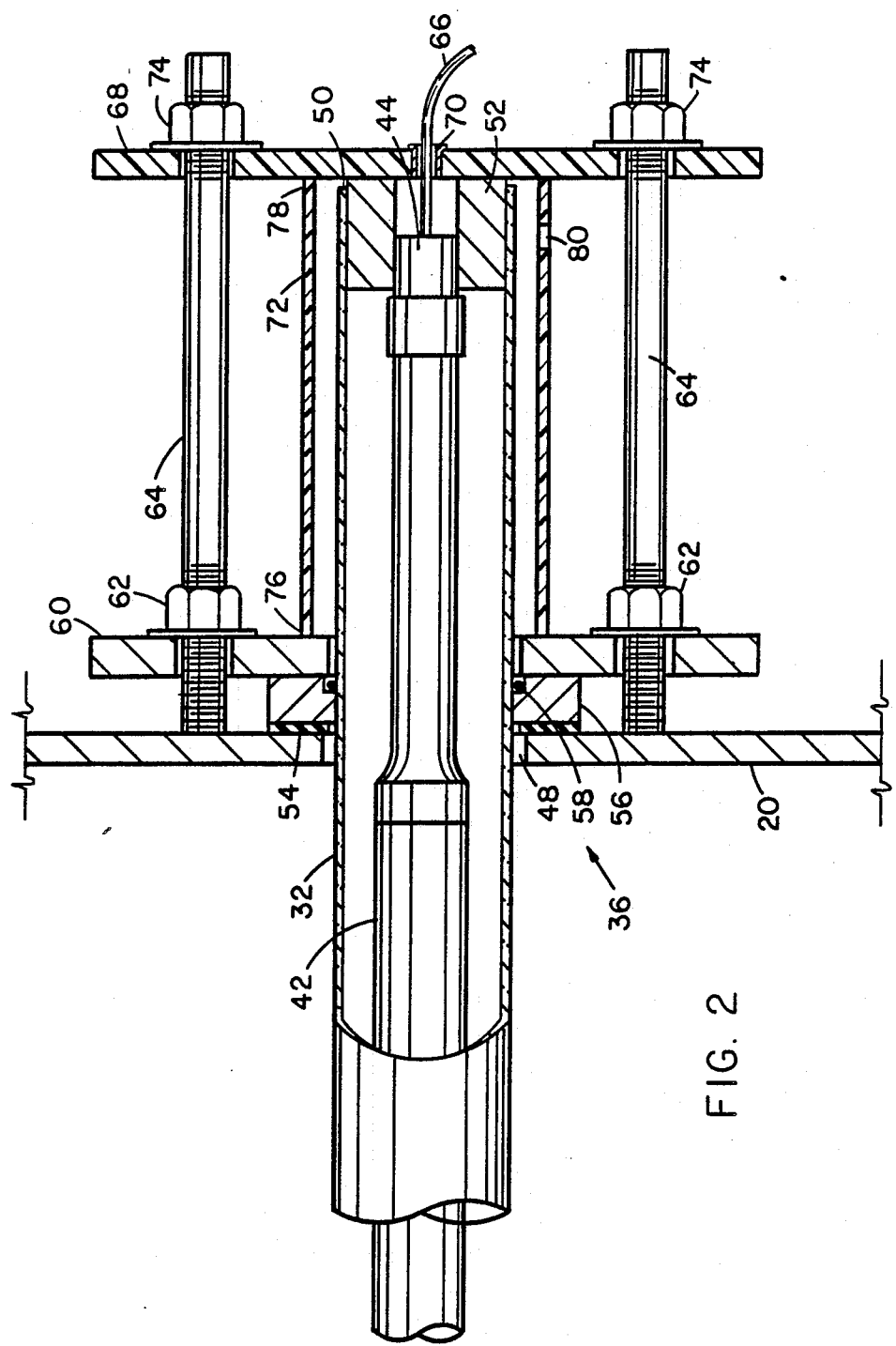
FIG. 2 is a fractional side elevational view partly in cross-section showing the lamp seal assembly.

Each of the lamp-enclosing tubes terminates at each end in a lamp seal assembly, of which the assembly 36 is typical. The assembly 36 is shown in greater detail in FIG. 2.

As described above, it is vitally important that the oxidation chamber be liquid-tight and that the ultraviolet lamps be prevented from coming into direct contact with the liquid being treated. Further, the lamp should be electrically insulated from the wall of the oxidation chamber and also thermal expansion of the ultraviolet lamp and of its protective tube must be accommodated. These requirements are met by the lamp seal assembly 36 shown in FIG. 2.

In accordance with the preferred embodiment, the lamp 42 extends across the entire width of the oxidation chamber, from the first wall 20 to the wall 22, and actually extends outwardly beyond the walls of the chamber a short distance. The end portion 44 of the lamp 42 fits into the cylindrical plug 52, which serves as a spacer to keep the lamp centered within but spaced radially from the tube 32. The cylindrical plug 52 is composed of aluminum or other heat and ultraviolet resistant material, and it fits with a loose sliding fit within the tube 32. Likewise, the end portion 44 of the lamp fits into the cylindrical plug 52 in a loose sliding fit.

The tube 32 is composed of quartz in the preferred embodiment and passes through the aperture 48 in the chamber wall 20. An annular gasket 54 surrounds the aperture 48, and a sealing contact is established between the chamber wall 20 and the O-ring retainer 56 by means of the gasket 54. This sealing contact is maintained by pressure exerted by the compression plate 60 against the O-ring retainer 56 when the nuts 62 are tightened on the studs 64. The O-ring 58 establishes a seal between the tube 32 and the O-ring retainer 56.

Conventional practice would have suggested sealing the tube 32 directly to the chamber wall 20 by a single O-ring seal, in the manner suggested by the aforementioned U.S. Pat. No. 3,485,576. However, that approach would have required machining of the chamber wall, with the result that any damage to the machined surfaces would require replacement of the entire chamber.

In contrast, the present inventor has devised a seal that requires no machining of the chamber wall (except, of course, for providing the aperture 48) and which maintains a tight seal even as the tube 32 expands and contracts. In accordance with the present invention, this is achieved by first establishing a seal between the chamber wall 20 and the O-ring retainer 56 by means of the gasket 54, and then achieving a seal between the tube 32 and the O-ring retainer 56 by means of the O-ring 58. In this preferred embodiment, if the gasket 54, the O-ring 58, or the O-ring retainer 56 becomes defective, the defective part can be readily replaced.

The portion of the lamp that projects outside of the chamber wall 20 acts like a radio antenna when electric current is applied to the lamp 42 on the wire 66, which is insulated from the cover plate 68 by means of the feed-through 70. To reduce the electromagnetic emanations, in the preferred embodiment the projecting portion of the lamp 42 is surrounded by the cover tube 72, which is composed of a phenolic compound. A first end 76 of the cover tube 72 bears against the compression plate 60, and the second end 78 of the cover tube 72 bears against the cover plate 68. The cover tube 72 is held in position by pressure exerted by the cover plate 68 when the nuts 74 are tightened. The cover tube 72 includes a downwardly directed hole 80 through which liquid can be discharged in the unlikely event that the tube 32 breaks or O-ring 58 leaks.

FIGS. 3-7 are a set of diagrams that show a number of ways in which the oxidation chamber can be configured to alter the locations of the input and output distributors and, more importantly, to permit the oxidation chamber to be adapted for use with an extremely wide range of volumetric flow rates. It will be noted that in FIGS. 3-5, the inlet and the outlet are on opposite ends of the chamber, while in FIGS. 6 and 7, the inlet and outlet are on the same end of the chamber. Further, it will be noted that in FIGS. 3, 4 and 6, the liquid follows a serpentine flow path that passes through the three segments of the chamber in series. In contrast, in FIGS. 5 and 7, the liquid flows in parallel through the three segments of the chamber. Thus, FIGS. 3-7 cover the four possible combinations of connections and flow paths. It is also noteworthy that no change to the oxidation chamber itself is required with any of these configurations, and the positions of the baffles remain the same in FIGS. 3-7. The difference in the flow paths is not produced by altering the positions of the baffles, but instead is produced by the selection and installation of the inlet distributor and the outlet distributor.

From FIGS. 3-7 it can also be seen that there are three types of distributors used: a short distributor such as the distributor 90 of FIG. 3 which spans one segment of the chamber; a long distributor of the type exemplified by the distributor 92 of FIG. 4 having holes only in the last segment of its length; and, a long distributor such as the distributor 94 of FIG. 5 that has holes throughout its entire length.

All of the possible combinations shown in FIGS. 3-7 can be constructed if two distributors of each of the three types are provided. These six distributors and the oxidation chamber may be thought of as constituting a kit of parts from which any of the configurations of FIGS. 3-7 can be constructed by selection of the appropriate distributors.

The distributors are relatively simple and inexpensive parts, and by appropriate selection of these distributors, the basic oxidation chamber can be adapted to any of the configurations shown in FIGS. 3-7. This feature of the preferred embodiment greatly extends the versatility of the basic oxidation chamber.

The basic oxidation chamber is provided with upper ports 100, 102 on its first end wall 20 and second end wall 22, respectively and is provided with lower ports 104, 106 on the first end wall 20 and second end wall 22, respectively. Only one upper port and one lower port are used at any particular time, and the unused ports are sealed with covers, of which the covers 96 and 98 are typical.

The distributors, of which the distributor 92 of FIG. 4 is typical, include a length 108 of pipe closed at the end 110 that is inserted into the chamber, and provided at its opposite end 112 with a flange 114. The length of pipe 108 includes a number of holes, the location of which depends on the type of distributor. For example, in the short distributor 90 of FIG. 3, the holes are located to supply liquid only to the first segment of the chamber; in the longer distributor 92 of FIG. 4, the holes are located near the end 110 for supplying liquid to or removing liquid from only one segment of the chamber; the long distributor 94 of FIG. 5 is provided with holes along its entire length so as to permit it to supply liquid to or remove liquid from all of the segments of the chamber simultaneously.

All of the configurations in FIGS. 3-7 make use of a single pair of baffles 28, 30. It is considered to be within the scope of the present invention to add additional pairs of baffles, and in general to have N pairs of baffles, which would partition the oxidation chamber into 2N+1 segments. The segment nearest the wall 20 would be referred to as the first segment, while the segment adjacent the wall 22 would be referred to as the last segment. Likewise, the baffles closest to the walls 20 and 22 would be called, respectively the first and last baffles.

Further versatility with regard to flow rate can be obtained through the use of larger or smaller holes in the distributors.

Figure 8:
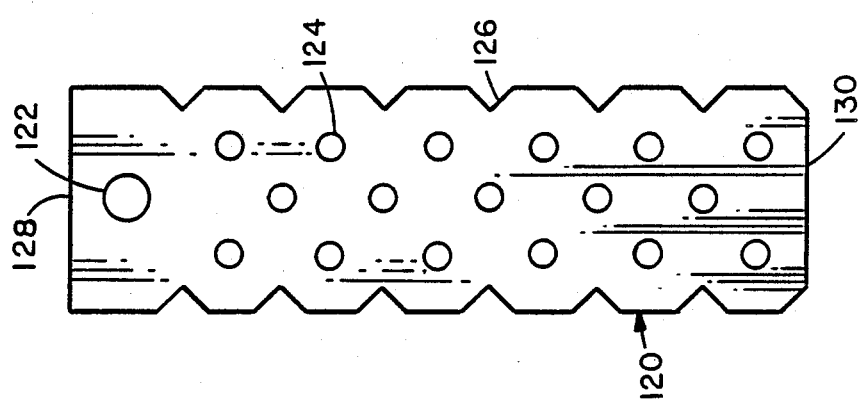
FIG. 8 is an elevational view showing a baffle used in the oxidation chamber of FIG. 1; and, FIG. 9 is a side elevational view in cross-section showing a sight port used in the oxidation chamber of FIG. 1.

FIG. 8 shows a typical baffle 120. It should be noted that the baffles 28 and 30 are identical in shape. Each baffle includes a relatively larger hole 122 to permit passage of a distributor, and also includes a number of smaller holes, of which the hole 124 is typical, to permit passage of the tubes 32 that contain the ultraviolet lamps 42. Because the baffles all have the same shape, and because they are mounted on the planar walls of the chamber, it is clear that the holes are in registration. The notches in the edges of the baffle, of which the notch 126 is typical, accommodate grooves in the front wall 16 and rear wall 18. These grooves introduce turbulence to the flow of liquid through the chamber. They also prevent the liquid from occupying a space where the ultraviolet radiation is less intense.

The length of the baffle 120 is less than the internal height of the oxidation chamber, so that when the edge 128 is attached to the top or bottom wall of the chamber, the opposite edge 130 is spaced from the opposite wall. This permits the construction of the serpentine flow paths shown in FIGS. 3, 4 and 6.

Although the baffle 120 includes a number of holes 124 for installation of ultraviolet lamps, it is not necessary for all of the lamp positions to be filled. This permits the number of lamps and their location to be altered as might be required by changing flow rates, concentrations of contaminants, contaminant characteristics, or regulatory requirements.

The apertures 48 in the first end wall 20 and second end wall 22, through which the tubes 32 extend are arranged in a pattern that matches the pattern of the holes 124 on the baffle 120. When not all of the possible ultraviolet lamps are used, the unused apertures can be closed by plugs (not shown).

Figure 9:
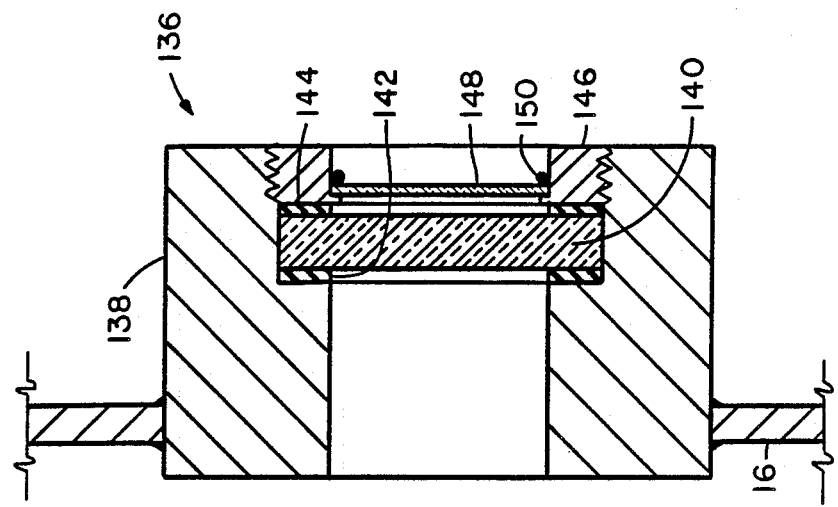

Monitoring and control of the performance of the oxidation chamber is facilitated by sight ports of which the sight port 136 shown in FIG. 1 and in greater detail in FIG. 9 is typical. In the preferred embodiment, the sight port 136 includes a housing 138 that is welded to the front wall 16 of the oxidation chamber. A quartz window 140 fits snugly within a bore in the housing 138 and is sealed by the gaskets 142, 144, which are maintained in compression by the threaded retainer 146. An acrylic window 148 is located on the outside of the quartz window, and the window 148 is held in position by a readily removable O-ring 150. This arrangement allows safe viewing of lamp performance because the window 148 absorbs potentially harmful ultraviolet radiation, while the required heat, chemical resistance, and strength, along with good ultraviolet transmissivity, is provided by the quartz window 140. When the ultraviolet radiation intensity is to be measured, an authorized serviceman removes the O-ring 150 and the acrylic window 148 to permit an ultraviolet radiation sensor to be positioned directly in front of the quartz lens so that the ultraviolet intensity can be measured to determine the need for lamp replacement and/or tube cleaning, without disassembly of any water-retaining part of the oxidation chamber.

Thus, there has been described an oxidation chamber having a structure that permits it to be readily adapted to a wide range of flow rates and conditions by the relatively simple operation of substituting one set of distributors for another set.

The oxidation chamber employs a novel lamp sealing assembly which facilitates cleaning of the tube which protects the ultraviolet lamp and allows for convenient replacement of the ultraviolet lamp when necessary.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. A liquid treatment chamber comprising:
   a top wall;
   a bottom wall;
   a front wall;
   a rear wall;
   a first end wall;
   a second end wall opposite said first end wall;
   at least one pair of baffles, each baffle oriented parallel to said first end wall and each baffle extending from said front wall to said rear wall, consecutive baffles being designated by the integers 1 through 2N with baffle 1 facing said first end wall, where N is the number of pairs of baffles;
   the odd numbered baffles extending upward from said bottom wall and having upper edges spaced from said top wall, the even numbered baffles extending downward from said top wall and having lower edges spaced from said bottom wall, whereby the baffles define a serpentine flow path of 2N+1 adjacent segments and having a total length equal approximately to 2N+1 times the height of the chamber;
   the odd numbered baffles having holes located near their lower edges, the holes in registration and located lower than the lower edges of the even numbered baffles, the even numbered baffles having holes located near their upper edges, the holes in registration and located above the upper edges of the odd numbered baffles.

2. The liquid treatment chamber of claim 1 further comprising:
   upper ports extending respectively through said first and said second end walls and in registration with the holes in the even numbered baffles; and
   lower ports extending respectively through said first and said second end walls and in registration with the holes in the odd numbered baffles.

3. The liquid treatment chamber of claim 2 further comprising:
   a low flow rate inlet distributor extending through either lower port, through the hole in the first baffle, and having holes opening into the first segment for admitting liquid thereto; and,
   a low flow rate outlet distributor extending through either upper port, through the hole in the last baffle, and having holes opening into the last segment for receiving liquid therefrom;
   whereby a low flow rate liquid flow path is established in which the liquid flows through all of the segment in series.

4. The liquid treatment chamber of claim 2 further comprising:
   a high flow rate inlet distributor extending through either lower port, through the holes in the odd numbered baffles, and across all of the segments, and having holes opening into all of the segments for admitting liquid thereto; and,
   a high flow rate outlet distributor extending through either upper port, through the holes in the even numbered baffles and across all of the segments, and having holes opening into all of the segments for receiving liquid therefrom;
   whereby a high flow rate liquid flow path is established in which the liquid flows through all of the segments in parallel.

5. A liquid treatment chamber notable for its capability of accommodating either low or high volume flow rates by a simple reconfiguration, comprising;
   a top wall;
   a bottom wall;
   a front wall;
   a rear wall;
   a first end wall;
   a second end wall opposite said first end wall;
   at least one pair of baffles, each baffle oriented parallel to said first end wall and each baffle extending from said front wall to said rear wall, consecutive baffles being designated by the integers 1 through 2N with baffle 1 facing said first end wall, where N is the number of pairs of baffles;

the odd numbered baffles extending upward from said bottom wall and having upper edges spaced from said top wall, the even numbered baffles extending downward from said top wall and having lower edges spaced from said bottom wall, whereby the baffles define a serpentine flow path of 2N+1 adjacent segments and having a length equal approximately to 2N+1 times the height of the chamber;

the odd numbered baffles having holes located near their lower edges, the holes in registration and located lower than the lower edges of the even numbered baffles, the even numbered baffles having holes located near their upper edges, the holes in registration and located above the upper edges of the odd numbered baffles;

upper ports extending respectively through said first and said second end walls and in registration with the holes in the even numbered baffles;

lower ports extending respectively through said first and said second end walls and in registration with the holes in the odd numbered baffles;

a low flow rate inlet distributor insertable through either lower port, through the hole in the first baffle, and having holes opening into the first segment for admitting liquid thereto;

a low flow rate outlet distributor insertable through either upper port, through the hole in the last baffle, and having holes opening into the last segment for receiving liquid therefrom;

whereby when said low flow rate inlet distributor and said low flow rate outlet distributor are inserted, a low flow rate liquid flow path is established in which the liquid flows through all of the segments in series;

a high flow rate inlet distributor insertable through either lower port, through the holes in the odd numbered baffles, and across all of the segments, and having holes opening into all of the segments for admitting liquid thereto;

a high flow rate outlet distributor insertable through either upper port, through the holes in the even numbered baffles, and across all of the segments, and having holes opening into all of the segments for receiving liquid therefrom;

whereby when said high flow rate inlet distributor and said high flow rate outlet distributor are inserted, a high flow rate liquid flow path is established in which the liquid flows through all of the segments in parallel.

* * * * *